Feb. 16, 1960   B. M. S. KALLING ET AL   2,925,337
METHOD OF PRODUCING ROLLED STEEL PRODUCTS FROM
FINE GRAINED IRON MATERIAL
Filed March 21, 1955   2 Sheets-Sheet 2
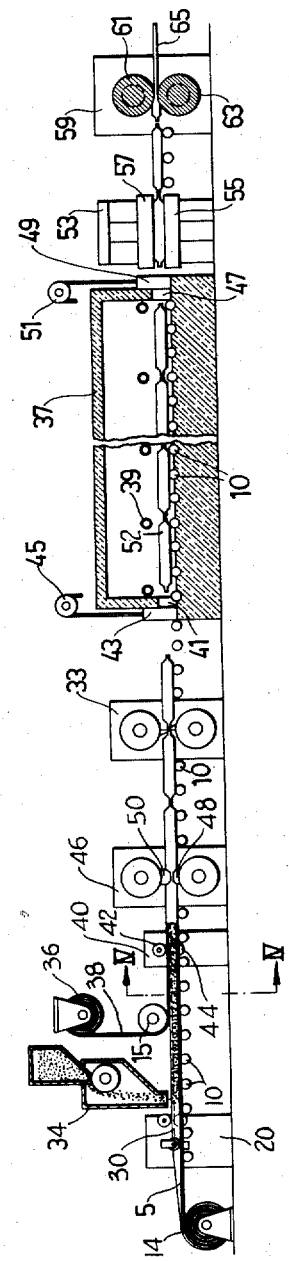
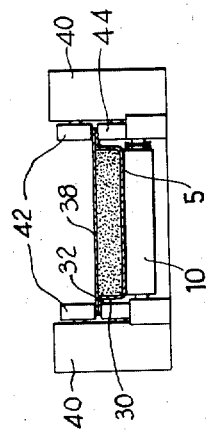
Inventors
Bo Michael Sture Kalling
Sven Gustav Harald Eketorp
Folke Carl Evald Johansson
by Pierce, Scheffler & Parker
attys

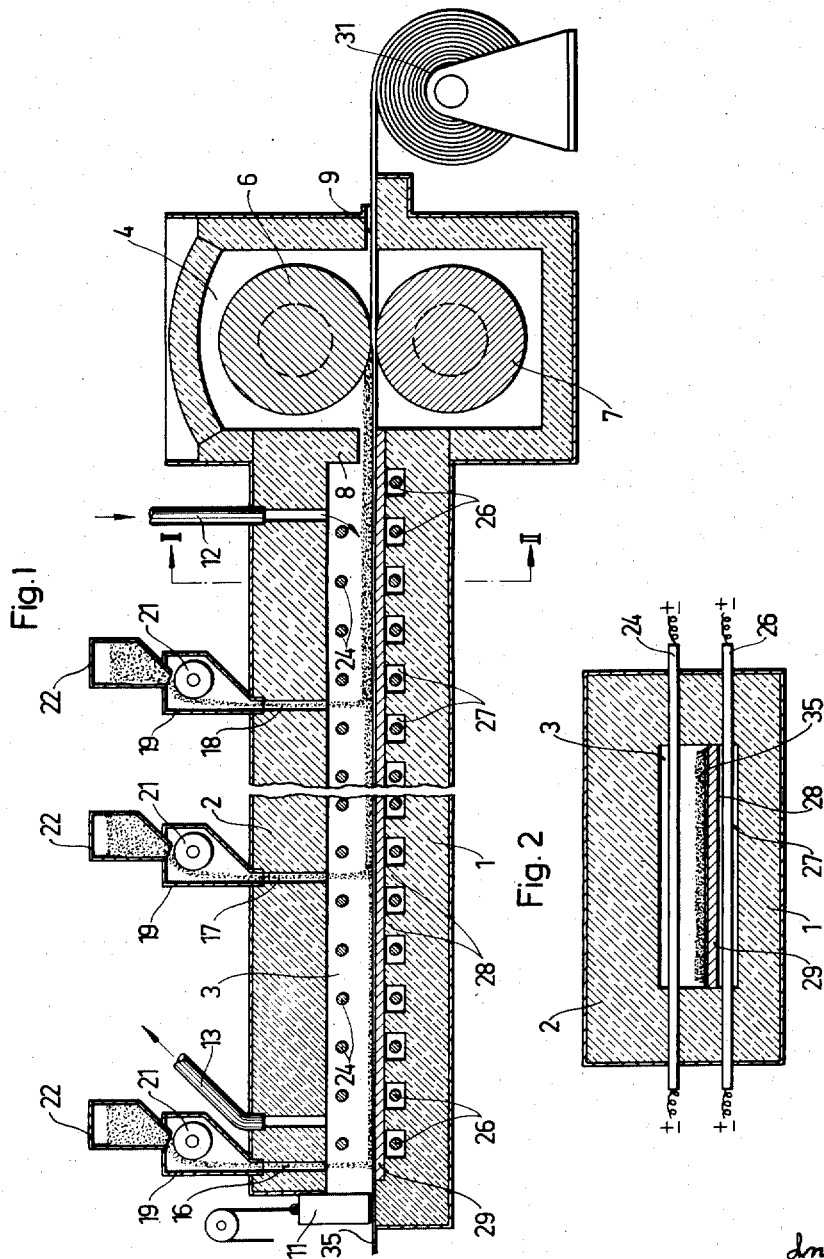

United States Patent Office 2,925,337
Patented Feb. 16, 1960

2,925,337

METHOD OF PRODUCING ROLLED STEEL PRODUCTS FROM FINE GRAINED IRON MATERIAL

Bo Michael Sture Kalling, Sven Gustav Harald Eketorp, and Folke Carl Evald Johansson, Borlange, Sweden, assignors to Stora Kopparsberg Bergslags Aktiebolag, Domnarnet, Sweden, a Swedish company Application March 21, 1955, Serial No. 495,558

Claims priority, application Sweden March 26, 1954

8 Claims. (Cl. 75—208)

This invention concerns a method of producing rolled products, such as plates, bands, rods, wire and structural steel shapes of unalloyed or alloyed steel, starting from a fine grained material substantially consisting of carbon-free or carbonaceous iron in unalloyed or alloyed form, and, if desired, a compound of iron, which can be easily reduced to iron, such as iron oxide, also in fine grained form. The powder or the powder mixture is given such a composition, and is heated to such temperature, that the product so obtained, has the desired analysis, after which the material is rolled. The rolling temperature must be kept so high that the individual grains are welded together to form a compact product. In order to support it or keep it together during the heat treatment and the following rolling operation, and, when necessary, to protect it from oxidation, the powder, before or during a suitable stage of the process, is charged on to a support of sheet iron or is entirely or partly enclosed in a wrapping of sheet iron. By the rolling this sheet iron and the powder material are completely welded together so that one single unitary continuous steel product is obtained. The material in the sheet iron should, in principle, preferably be of the same composition as the steel produced.

The invention is more particularly concerned with the use of pig iron as a starting material for the process. The pig iron is heated in fine grained form in a suitable manner admixed with some iron oxide containing material, also in fine grained form, to such a high temperature, that the principal part of the carbon content is thereby oxidized at the same time that a reduction takes place of the principal part of the iron oxide under development of gaseous carbon oxides. The rolling of the more or less sintered product will then preferably take place directly subsequently to the heat treatment.

The pig iron is preferably produced from the iron ore in a blast furnace or electrical furnace. Also pig iron, melted in a cupola furnace or in some other kind of furnace, or obtained from melting and carbonizing of scrap iron may, however, be used in the process. The pig iron is suitably finely divided through granulation from melted condition with water, steam, air or a combination thereof, whereafter the obtained granulate, if necessary, is further crushed to the desired grain size. This size should be principally below 1 millimeter.

In order to obtain a steel free from slag, it is essential, that the percentage of silicon and other easily oxidizable substance is low. The percentage of silicon should be below 0.2% and preferably below 0.1%. The pig iron should therefore in general be pre-refined before the granulation according to some method known per se. It is most suitable to do the refining with pure oxygen or oxygen enriched air.

The percentage of carbon in the pig iron is of no great importance for the metallurgical process. It should, however, not be so low that the pig iron thereby becomes too tough for a fine crushing operation that may be needed. A suitable lower limit is 2.5%.

The iron oxide material, if to be used, should preferably consist of one or more iron oxides or other substances that are converted into oxide form when heated, such as hydrate or carbonate. The material should have a minimum percentage of impurities, such as silica and other rock constituents.

It may be advantageous to partly reduce the iron oxide material intended for the charge before its introduction into the charge so as to obtain ferrous oxide or even partly metallic iron. It has been found that it is of particular advantage to use iron ore pre-reduced into ferrous oxide when a particularly even percentage of carbon is desired in the product. In this way a more constant percentage of carbon dioxide in the produced reaction gas is obtained, whereby the decarburizing effect of the oxidation agent will also be more even.

The rolling of the decarburized product should take place at high temperature in order that a good welding together of the grains mutually and to the sheet iron covering may take place. The temperature should be at least 1150° C. or preferably 1200° C. or even still higher. During the carbon reaction, when taking place in a material degree, the temperature should, however, be kept lower, suitably at 950–1050° C., in order to obtain an even carbon percentage. It is further of importance that the temperature gradient in the material is not too high during the reaction. Before the heating to the reaction temperature takes place, a pre-heating should therefore take place at a temperature below the limit, about 800° C., where the reaction commences more noticeably. First after the material has been well heated through at this temperature, the temperature is raised to the temperature most favorable for carrying out the carbon reaction.

In order to obtain an even percentage of carbon it may be possible to proceed by letting the material pass through a grinding operation after the reaction principally has taken place, whereafter the powder, obtained in this manner, is heated again, finished and then rolled.

In the production of sheet or plate or band according to the invention, which will be more fully described in the following, the powder charge is placed in a layer of suitable thickness on a relatively thin sheet or plate and is transported through the heating furnace while supported thereon. By using the support plate in the form of a band, suitably with flanged edges, it is possible to make the process fully continuous very easily. The band with the charge is then fed at a suitable speed through the heating furnace, after which it is subjected to the first heat treatment, which also in this case should occur in a sufficiently strongly reducing atmosphere that the oxidation of the iron is avoided. In the rolling, however, the compression of the material may be done so completely, even at the first roller pass, that the continued rolling, if such is necessary, may without difficulty take place in the open air. The first pass of the rolling should preferably be done with edging rolls or in a closed pass so that the plate wrapping is pressed against the powder charge from all directions.

The heating furnace, which should be kept well closed to prevent air leakage, is suitably heated electrically or indirectly, if the heating is done with fuel.

In order that the powder layer be kept on the support plate in an even layer during the treatment, it may be advantageous to turn up the edges of the plate by means of some preferably automatic bending arrangement, preferably before the filling of the powder starts.

If supporting material in band form is not available, but only in the form of shorter sheets or plates, it is easy, if so desired, to establish a continuous process by splicing them by welding or in some other way, as they are being fed along. The plates may naturally also be shaped as low open boxes of suitable length which could be successively fed forward through the heating furnace.

Certain difficulties may be encountered in obtaining an even and sufficiently high temperature in the interior or at the bottom of the powder layer, especially if the same is thick. This difficulty may be reduced by feeding the powder on to the plate or band or into the boxes, at certain intervals. This may be done so that at first a relatively thin layer is fed to the plate, whereafter it is heated to desired temperature. Then a second layer of powder is spread on top thereof and treated in the same manner, whereafter the next layer is charged and treated and so on. If the feeding through the furnace is continuous, the charging of various layers may be easily arranged through slits in the furnace arch, located at suitable distances from each other.

It may be suitable to let the support plate slide directly on the bottom of the furnace room which should be plane but may be inclined towards the discharge end to facilitate the forward movement. With the same object in view, the material of the bottom of the furnace room should be of such kind that the friction between this bottom and the plate will not be too great. In the heating furnace also other conventional feeding devices may come into consideration.

In order to protect the iron in a simple and effective manner from coming into contact with oxidizing gases during the process it is usually advantageous to cover the charge with a plate whereby the entrance of oxidizing gases may be entirely prevented and the process may be made independent of the atmosphere in the furnace. In this way also the considerable advantage is gained that the subsequent heat treatment may very well take place in the open air. In this case the heating need not necessarily be done in furnaces of special construction but may be done in furnaces of standard type.

The joining of the cover plate with the support plate may be done by folding, but, in general, is best accomplished by welding according to some conventional method, for instance electric seam welding. In the continuous performance of the process, the cover plate may be designed in the shape of a band which is continuously fastened to the support plate after the edge of the one or both plates has been turned up (flanged) and the charge filled on.

If a cover plate is used, it is possible, especially if the plates are welded together, to let the plate package move at a larger or smaller inclination or even vertically at the charging as well as the heating and rolling end of its path.

It is not always suitable to make the process entirely continuous. The rolling should be done at a considerably higher speed of the material than the heat treatment. Also when using a plate it may be to advantage to subdivide the charge in plate packages of desired lengths before or at a suitable stage in the process and remove these plate packages from the furnace at suitable time intervals for rolling.

When operating the process with a cover plate suitably located openings must be provided for discharge of any reaction gas, for instance openings in the weld or the folding along the edges of the plates.

In order that the product shall be uniform and of good quality, it is essential that the heat treatment be performed in several operations. It may be suitable, in order to make the material uniform to anneal the product before the treatment is finished.

The support and the cover plates may suitably be made from the material produced by the process. Since these plates are recovered in the finished material a very insignificant loss of material is occasioned. The increase in cost incident to the use of cover plates is therefore restricted to the cost of re-heating the plate besides the simple power consuming operations which the same has to go through during the process.

The method is not limited to the production of plates and bands. Also rods, wire and structural shapes may be produced according to the process provided that the powder package is given a section, for instance square or circular, suitable for rolling and forging to such dimensions.

The blanks should not have too large a cross section. In the rolling of thin plate it has, for instance, appeared to be desirable to limit the thickness of the blanks to about 50 millimeters, particularly if the rolling takes place immediately after a decarburizing treatment. With too heavy blanks variations in the percentage of carbon in the product is easily occasioned and the heating through the entire cross section takes a long time. An improvement in this respect is the method referred to above in which the material is charged in layers. If heavy blanks are desired it is possible to proceed in such a way that a number of thinner blanks which have been separately heat treated, are placed on top of each other and are rolled at such a high temperature that they are completely welded together. This welding together may take place first after the separate blanks have gone through a rolling operation.

The advantage with this present method as compared with other methods for producing steel products is primarily that several functions in the traditional steel production, such as steel smelting and subsequent blooming are completely eliminated. In the decarburization of pig iron with magnetite concentrate the yield of steel, reckoned on pig iron, will be about 110%. The fact that no loss of iron takes place in slag or smoke, and, further, the fact that the scrap can be kept to a minimum both contribute to a high yield. Among other advantages of the process may be mentioned that a product with a percentage of carbon below 0.02% and even below 0.01% may be produced, and that the absorption of nitrogen during the treatment is prevented. The percentage of carbon in the steel may easily be given the desired value by the variation of the composition of the powder mixture. The formation of segregations in the product may also be entirely eliminated. This seems to be a contributory reason for the fact that the percentage of phosphorus may surpass 0.15% and may reach 0.5% or even more without jeopardizing the good strength properties of the steel produced. It has been found that it is quite possible with the method according to the invention described to produce steel qualities fully comparable to a good Martin-steel.

The invention will now be described with reference to embodiments illustrated in the attached drawings to which, however, the invention is not limited. In the drawing Fig. 1 shows a diagrammatic longitudinal section through a continuous oven, in which the present process may be executed, and Fig. 2 shows a cross section through the oven along the line II—II in Fig. 1. Fig. 3 shows a partly continuous, partly intermittent arrangement and Fig. 4 shows a section along the line IV—IV in Fig. 3.

The continuous heating oven is built from fire-proof material and has a bottom 1 and a ceiling 2, which may be arched and a longitudinal channel 3 for the material to be treated. The oven is connected at the one end to a closed chamber 4 in which two rotatable cylinders 6 and 7 are located. The cylinders may be driven or idle. They may be kept warm in a known manner. At the outlet of the channel 3 into the chamber 4 an overhang 8 is arranged from the oven ceiling 2 to limit the height of the opening. The chamber 4 has a discharge opening 9.

At the end of the oven opposite to the chamber 4 a door 11, that may be lifted, is located for the purpose of avoiding or lessening the gas leakage from the oven.

Through the ceiling 2, an inlet 12 is provided close to the chamber 4 for the supply of protecting gas, if such should be needed, and at the inlet end of the oven a gas outlet 13 is provided through the ceiling 2. A number, for instance three, evenly distributed slits 16, 17 and 18 are located in the ceiling along the whole width of the channel 3. These slits are connected to a distributing device 19 for powder which may be constructed in any suitable manner, and in this illustrated embodiment consist of a housing, enclosing a rotatable cylinder 21, and feed hopper 22.

Heat is supplied to the oven by means of a number of resistance bars for electric power, for instance made from carborundum. In the oven chamber proper the bars 24 are arranged transversely in the channel 3 in order to deliver heat to the upper side of the material to be treated while the bars 26 are arranged in the transverse direction of the channel in the bottom of oven 1 in depressions 27 which are separated by plinths 28 on which the oven floor 29 is supported. The electric heating may be substituted by indirect gas heating, the gas channels being located in the oven ceiling or in the oven bottom or in both and possibly also at the sides.

At the outlet opening 9 of the chamber 4 a winder 31 may be provided for winding the obtained product when it is in band form.

In a continuous operation according to the invention, for converting, for instance, pig iron powder of suitable analysis into plate, an iron plate 35 with a thickness of, for instance, about 1 millimeter is passed through the inlet end of the heated oven, after having been provided, if desired, with somewhat turned up edges. As the plate 35 runs forward through the oven channel it is sprinkled with pig iron powder admixed with the necessary quantity of iron oxides, for instance in the form of highly concentrated dressed iron ore, from the slits 16, 17 and 18, which should be so positioned that the powder will be sufficiently heated, for instance to 1100° C. that the reaction at least partly takes place before it reaches the next filling slit. The plate band 35 will finally reach the closed chamber 4 where the now more or less sintered powder will be compressed by the cylinders 6 and 7 to a compact body welded to the plate 35 into a unitary body which is discharged through the opening 9 and, if adequately thin, may be wound in a winder 31. From the winder the material is brought to some other place for final rolling in heated or cold condition, if desired, in combination with an annealing treatment.

The device shown in Figs. 3 and 4 is suitable for intermittent rolling of package goods but may naturally also be used for continuous rolling according to the invention. The device is particularly intended for usage where a cover plate is used which is at least partly welded to the support plate. Hereby the charge is effectively protected through the whole process and more conventional devices for heating and rolling may be used without inconvenience. The gas atmosphere in the oven need not be strongly reducing and the rolling may easily be performed in the open air.

The device comprises a transport bed, in this case formed by a number of rollers 10, along which bed a series of various devices are placed for various functions. At the start of the roller bed, a lower band roller 14 is located, from which the support plate band 5 is brought up to the roller bed, at the beginning of which an adge bending device 20 is located for bending up the edges 30 and also suitably for bending out their upper parts 32, to form a trough, which is more closely shown in Fig. 4. This bending device may be of any known kind, and is therefore not further described here. Somewhat further along on the roller bed, a powder filling device 34 is located for filling powder into the trough-formed support plate band. Also this device may be of any known kind, and need not be further described here.

Behind the filling device a bend roller 15 is located immediately above the bent-out outer edges 32 on the support plate band. Above the bend roller 15 an upper band roller 36 is provided, from which the cover plate band 38 is brought around the bend roller 15 to a seam welding device 40, located a bit further along the roller bed, for welding the cover plate band 38 to the outbent upper edge 32 of the support plate 5 by means of the welding rollers 42 and 44 in a manner known per se. The support and the cover plate bands with intermediate powder are brought from here further along the roller bed to a press 46, which is arranged, by means of lower and upper jaws 48 and 50 respectively, crosswise to press together the band package at intervals along a limited distance in their longitudinal direction of the band. Still further along the roller bed a cutting machine 33 is located for cutting off the package pieces by means of a cut in the groove, produced by the press machine 46. The press device as well as the cutting machine may be of known types and need not be further described here, as they do not form a part of the invention per se. If descired, the cutting may be performed at the same time as the pressing in a suitable machine for this purpose.

So far the process has progressed principally continuously, especially if the press- and cutting machines have been designed so that they accomplish their functions successively along a part of the roller bed, which is the case with certain rotating presses, with a pressing organ eccentrically located, and rotation cutting machines of known types.

After the cutting machine, the roller bed continues into an oven 37, it being, however, possible to arrange an interruption in the continuous roller bed between the cutting machine and the oven by inserting a storage of package pieces 52.

The oven 37 contains transport rollers 10 for the package pieces 52 and is in this case heated by means of electric heating elements 39, which are preferably located latitudinally against and above the roller bed. In its rear end, facing the cutting machine, the oven has an inlet 41, with a closing door 43, which may be hung on rollers 45. In a corresponding manner an outlet opening 47 at the opposite end of the oven may be provided with a door 49, hung on rollers 51. By means of these doors, the oven may be suitably closed between the intermittent in and out feeding of the package pieces.

On the outlet side of the illustrated device a package press 53 is arranged for compressing the package pieces before the actual rolling. Such pressing is not necessary but is often preferable. If desired, the press may be located quite close to the oven, so that the plate packages without considerable heat loss may be directly fed into the press. This contains in a known manner a lower and an upper pressing pad 55 and 57, respectively, the lower of which may suitably be stationary.

After the press 53 or, if this press is not used, after the oven 37, the mill stand 59 with the cylinders 61 and 63 is located. In this rolling mill, the first roller pass is performed and the finished plate 65 is here discharged as a finished product, which however, possibly in the same rolling mill, may be further subjected to further hot and cold rolling in order to obtain desired thickness and desired qualities.

In the seam welding apparatus 40 the edges may in this case be entirely welded together, as the package pieces at the pressing and the cutting in apparatuses 46 and 33 will, true enough, be compressed in the ends, but yet not more than that gas evolved may be pressed out through the narrow opening between the plates in the ends of the package pieces during the reaction that takes place at the heating in the oven 37. The communication through these narrow openings is, however, made so difficult, that an injurious leaking in of air or other oxidizing gases during the treatment, need not be feared.

The continuous feeding at the start of the plant is suitably accomplished through having at least a few of the rollers 10 power driven, but special feeding means may also be provided, for instance, in connection with or after the welding apparatus 40.

The present invention concerns, in the first instance, direct production of rolled steel products. The method may, however, be used to advantage for treatment of other metallic materials in powder form, by applying the method given in this description.

What is claimed is:

1. Method for the manufacture of hot rolled steel products directly from pig iron which comprises mixing pig iron having a silicon content of not more than 0.1 percent and an iron oxide material both comminuted to a grain size substantially below 1 mm. in such proportions that the oxygen content of the iron oxide material is sufficient for reducing the carbon content of the pig iron to a value which makes said iron rollable simultaneously with the conversion of the iron oxide material to metal, introducing said mixture into a steel sheet structure, substantially closing said steel sheet structure while maintaining small openings therein at spaced intervals permitting escape of gases formed during reaction between the pig iron and the iron oxide material, heating said closed structure and the mixture therein to reaction temperature below the melting point of the pig iron for a sufficient period of time to convert said mixture into steel, and hot rolling said steel sheet structure with its content to a unitary rolled product.

2. Method as defined in claim 1 in which the pig iron contains at least 2.5% of carbon.

3. Method as claimed in claim 1 in which said iron oxide material substantially consists of ferrous oxide.

4. Method as claimed in claim 1 in which said heating takes place in two stages, the first of said stages being carried out at a temperature below that limit of about 800° C. at which the carbon reaction noticeably starts, the second of said stages being carried out at a temperature sufficiently high for the reaction to be completed, the temperature of the material being equalized between said stages.

5. Method as claimed in claim 1 in which said heating is carried out substantially at a temperature of 950–1050° C.

6. Method as claimed in claim 1 in which the percentages of phosphorus in said iron material and said iron oxide material are such that the steel material obtained therefrom by said heating contains from 0.15% to 0.5% of phosphorus.

7. Method as claimed in claim 1 in which said structure is in the form of a support band which is continuously fed along a track and at at least one place continuously supplied with said pig iron and iron oxide materials, a cover plate band being continuously fed to and placed upon said support band said support band and said cover band being welded together at their edges, the continuous package thus formed being cut transversely into a plurality of packages which are subjected to said heating and said compression.

8. Method as claimed in claim 7 in which the continuous package formed by said welding is compressed transversely to form depressions, said continuous package being cut in said depressions to form said plurality of packages, the lengths and depths of said depressions being sufficient for substantially preventing said pig iron and iron oxide materials from escaping.

References Cited in the file of this patent

UNITED STATES PATENTS

| Number | Name | Date |
|---|---|---|
| 92,876 | Nichols et al. | July 20, 1869 |
| 1,652,829 | Losey | Dec. 13, 1927 |
| 1,930,287 | Short et al. | Oct. 10, 1933 |
| 2,170,158 | Rennerfelt | Aug. 22, 1939 |
| 2,198,253 | Koehring | Apr. 23, 1940 |
| 2,290,734 | Brassert | July 21, 1942 |
| 2,339,208 | Van Der Pyl | Jan. 11, 1944 |
| 2,350,179 | Marvin | May 30, 1944 |
| 2,372,607 | Schwarzkopf | Mar. 27, 1945 |